United States Patent [19]

Myers

[11] Patent Number: 4,770,811

[45] Date of Patent: Sep. 13, 1988

[54] SENSITIZED LASER GLASS

[75] Inventor: John D. Myers, Perrysburg, Ohio

[73] Assignee: Kigre, Inc., Hilton Head Island, S.C.

[21] Appl. No.: 714,737

[22] Filed: Mar. 22, 1985

[51] Int. Cl.$^4$ .............................................. C03C 3/16
[52] U.S. Cl. ............................... 252/301.4 P; 501/45; 501/48
[58] Field of Search .................. 252/301.4 P; 501/45, 501/48

[56] References Cited

U.S. PATENT DOCUMENTS

| | | | |
|---|---|---|---|
| 3,979,322 | 9/1976 | Alexeev et al. | 501/48 |
| 4,075,120 | 2/1978 | Myers et al. | 501/48 |
| 4,225,459 | 9/1980 | Faulstich et al. | 501/48 |
| 4,239,645 | 12/1980 | Izumitani et al. | 501/48 |
| 4,248,732 | 2/1981 | Myers et al. | 501/48 |
| 4,333,848 | 8/1982 | Myers et al. | 501/48 |
| 4,390,637 | 6/1983 | Daiku | 501/64 |
| 4,470,922 | 9/1984 | Denker et al. | 501/48 |

FOREIGN PATENT DOCUMENTS

| | | | |
|---|---|---|---|
| 1409726 | 10/1975 | United Kingdom | 501/48 |
| 1008171 | 3/1983 | U.S.S.R. | 501/64 |

OTHER PUBLICATIONS

Edwards et al, *J. Phys. D: Appl. Phys.*, 12, 187–194 (1979).
Glass et al, "Laser Program Around Report–1975", pp. 201–204, UCRL–50021–35, L.L.L.
Coyle, "Laser Program Annual Report–1976", pp. 2:263–2:266 & 2:274, UCRL–50021–76, Lawrence Livermor Laboratory.
Avaneson et al, *Jou. J. Quantum Electron*, 9(#7), 935–6 (Jul. 1979).
Jacobs, *J. Appl. Phys*, 47(#5), 2020–2024 (May 1976).
Sharp et al, *J. Appl. Phys*, 44(#9), 4098–4101 (Sep. 1973).
Jacobs et al., Preprint UCRL–77625 (Dec. 1975) (for J. Appl. Phys., 47, 2020).
Myers, "Sensitization of Na$^{+3}$ Laser Glass . . .", Final Rept., (2–1977), for ERDS, No. CO–4028–5.

*Primary Examiner*—Edward A. Miller
*Attorney, Agent, or Firm*—Cullen, Sloman, Cantor, Grauer, Scott & Rutherford

[57] ABSTRACT

A sensitized laser glass which includes a primary lasing dopant and auxiliary dopants which absorb in regions of the flashlamp emission spectrum away from the absorption bans of the primary dopant and transfer the energy absorbed to the primary dopant, thus improving the efficiency and sensitivity of the laser glass. The auxiliary dopant comprises the combination of cerium and chromium as $Ce_2O_3$ and $Cr_2O_3$ and the primary dopant is a rare earth metal, preferably neodymium or erbium as $Nd_2O_3$ or $Er_2O_3$. Th auxiliary dopant consists essentially of 0.1 to 5% by weight $Ce_2O_3$ and 0.025 to 0.1% by weight $Cr_2O_3$, however the preferred concentration of the auxiliary dopant is 2 to 4% by weight $Ce_2O_3$ plus 0.03 to 0.07% by weight $Cr_2O_3$. The experimental data establishes that such auxiliary dopants are particularly suitable for phosphate laser glasses.

15 Claims, No Drawings

SENSITIZED LASER GLASS

FIELD OF THE INVENTION

A sensitized laser glass composition which includes a primary dopant of a rare earth metal and an auxiliary dopant comprising the combination of $Ce_2O_3$ and $Cr_2O_3$, wherein the auxiliary dopant absorbs energy in regions of the flashlamp emission spectrum spaced from the absorption bands of the primary dopant and transfers the energy to the primary dopant, thus substantially improving the overall pumping efficiency of the laser.

SUMMARY OF THE PRIOR ART

Several researchers have investigated the use of chromium as an auxiliary dopant in crystal lasers having a primary earth metal dopant to improve the overall efficiency of the laser. For example, Taylor reported a 65% efficient transfer from chromium to neodymium in yttrium orthoaluminate or yttrium aluminum garnet (YAG) laser crystals, see *Procedures of the Physics Society*, Vol. 9, p. 487 (1967). Yttrium orthoaluminate is a laser crystal into which both rare earth and chromium can be incorporated, *Appl. Phys. Lett.*, Kiss et al, Vol. 9, pp. 200 (1964). In theory, the auxiliary chromium dopant absorbs in regions of the flashlamp emission spectrum away from the absorption bands of the primary dopant and transfers the energy to the primary dopant (i.e., Nd), thus improving the overall efficiency of the laser. The chromium ions ($Cr^{3+}$) replace the aluminum ions in the laser crystalline structure to sensitize the fluoresence and thereby improve the optical pumping efficiency of the laser, see also *Journal of Applied Physics*, Webber, Vol. 44, No. 9, p. 4058 (1973).

Although these results have not been confirmed in practice, other researchers have suggested the use of chromium as an auxiliary dopant to sensitize laser glasses, see *Soviet Journal of Quantum Electronics*, Vol. 9 (7) p. 935 (1979) and Edwards et al, reported improved laser efficiencies resulting from the addition of chromium to a neodymium doped silicate laser glass, *J. Phys. D: Applied Physics*, Vol. 12, p. 187 (1979). In spite of the predicted improvement due to chromium sensitization, tests of silicate and phosphate laser glass by the Lawrence Livermore Laboratory actually showed a decreased gain for chromium sensitized laser glasses compared to laser glasses doped with neodymium only, see *Laser Program Annual Report*—1976, Lawrence Livermore Laboratory.

Cerium has been used in relatively high concentrations in neodymium doped silicate glass lasers as an anti-solarizing agent to prevent damage to the glass from ultraviolet flashlamp irradiation. Cerium has also been investigated as an auxiliary dopant in silicate laser glass because cerium absorption is in the near-ultraviolet spectral region, where significant emission from zenon flashlamp occurs, spaced from the absorption bands of neodymium, theoretically providing better utilization of the pump spectrum, see Jacobs, et al, *Journal of Applied Physics*, Vol. 47, No. 5 (1976). The theoretical improvement in pumping efficiency was not, however, confirmed by testing at Lawrence Livermore Laboratory, where the improvement due to energy transfer from cerium was found to be minimal, see *Laser Program Annual Report*—1975 and 1976.

Other auxiliary dopants including $U_2O_3^{2+}$, $Eu^{3+}$ and $Tb^{3+}$ have also been tried in laser glasses including neodymium as the primary dopant, however, testing has established that these auxiliary dopants do not result in a significant improvement in the pumping efficiency of the laser. As set forth above, experimental testing of chromium and cerium alone as an auxiliary dopant for rare earth laser glasses has established that such ions provide little or no improvement in pumping efficiencies. The need therefore remains for an effective sensitizing agent for rare earth laser glasses, as proposed herein.

SUMMARY OF THE INVENTION

The sensitized laser glass composition of this invention includes a primary lasing dopant of a rare earth metal and auxiliary dopants which absorb the laser flashlamp emissions in regions spaced from the absorption band of the primary dopant and transfers the energy to the primary lasing dopant, thus improving the pumping efficiency of the laser glass. The auxiliary dopants in the sensitized laser glass composition of this invention are chromium plus cerium. As set forth more fully hereinbelow, testing conducted by the applicant establishes that the effective concentration of chromium is between 0.025 and 0.10 percent by weight and the effective concentration of cerium is 0.10 to 5 percent by weight. Hereinafter, all percentages are given by weight. The more preferred concentration of chromium is 0.03 to 0.07% and the more preferred concentration of cerium is between 2 and 4%. The preferred nominal concentration of the auxiliary dopants are 0.05% chromium and 3% cerium. Phosphate laser glass has replaced silicate laser glass for laser rods in many applications based upon the advantages of phosphate glass laser rods, including a low laser threshold and chemical durability. U.S. Pat. No. 4,333,848 of Myers, et al, which is assigned to the assignee of the instant application, discloses an athermal phosphate laser glass composition which has a relatively high gain, constant beam divergence or athermal behavior and good chemical durability. The general composition of the athermal phosphate laser glass disclosed in said United States Patent, in weight percent, is as follows: 50 to 70% $P_2O_5$, 1 to 5% of an alkaline metal oxide, 15 to 40% BaO, 1 to 3% $Al_2O_3$, 0 to 25% CaO+SrO, 0 to 5% of a solarization inhibitor, preferably selected from the group consisting of $Sb_2O_3$, $Nb_2O_3$ and $SiO_2$, and 0.5 to 11% $Nd_2O_3$, or preferably 1 to 10% $Nd_2O_3$, which is the primary lasing dopant. Erbium has been substituted for the neodymium in commercial applications, wherein the concentration of $Er_2O_3$ is 0.05 to 1.0%. The primary lasing dopant is thus preferably selected from $Nd_2O_3$ and $Er_2O_3$ and the concentration may range from 0.05 to 25%. The chromium and cerium auxiliary dopants of the present invention are particularly suitable for the phosphate laser glasses described in said above-identified patent, resulting in a very substantial improvement in the pumping efficiency of the laser glass. The auxiliary dopants of this invention however, may also be suitable for other laser glass systems, including the commercial silicate laser glasses and the imperical data indicates that such auxiliary dopants will be suitable for other laser glass systems, as described above.

As described above, the sensitized laser glass of this invention provides substantial improvements in pumping efficiencies over the prior art. A more detailed description of the preferred embodiments of the sensitized laser glass composition of this invention follows.

DESCRIPTION OF THE PREFERRED EMBODIMENTS

As set forth above, the sensitized laser glass of this invention includes a primary lasing dopant of a rare earth metal, such as neodymium or erbium, and auxiliary dopants consisting of chromium plus cerium. As found by prior researchers, chromium, cerium and other elements have been considered as potential candidates for auxiliary dopants because these elements absorb in regions of the flashlamp spectrum spaced from the absorption bands of the commonly used primary lasing elements or dopants, particularly neodymium and erbium. The preferred candidates also have an emission spectra which overlaps the absorption bands of the primary dopant, such that energy transfer from the auxiliary dopant to the primary dopant was anticipated, resulting in improved pumping efficiencies of the laser glass. Tests conducted on laser glasses which included an auxiliary dopant were, however, unsuccessful. The addition of chromium to neodymium doped phosphate and silicate laser glasses, for example, actually resulted in a decreased gain and the addition of cerium resulted in only a very slight improvement in efficiency.

The reason the combination of chromium and cerium is successful in substantially improving the pumping efficiency of laser glass, while these potential auxiliary dopants were unsuccessful individually, is not fully understood. It is believed, however, that there is an energy transfer mechanism between $Cr^{3+}$ and $Ce^{3+}$ ions which is then transferred to the primary dopant. Further, tests with phosphate laser glasses having neodymium or erbium as the primary lasing dopant established that there is a relatively narrow range of concentrations of chromium and cerium which effectuates this energy transfer.

It is understood from absorption spectra of the primary lasing dopants, particularly neodymium and erbium, and the potential auxiliary dopants, chromium and cerium in phosphate, silicate, sodium and lithium laser glasses, that efficient transfer of energy from chromium or cerium to the primary dopants is potentially possible. $Cr^{3+}$ and $Ce^{3+}$ have strong and broad absorption bands which do not substantially overlap the absorption bands of $Nd^{3+}$ and $Er^{3+}$ to a substantial extent, however, the emission spectra of chromium and cerium ions do not substantially overlap the absorption band of the neodymium and erbium ions. Thus, chromium and cerium have been considered prime candidates for auxiliary dopants in laser glass, although the experimental data does not confirm this expectation.

The sensitized laser glass of this invention thus includes a primary lasing element or dopant of a rare earth metal, preferably neodymium or erbium, and an auxiliary dopant which comprises the combination of chromium and cerium preferably in a phosphate laser glass. Testing conducted by the applicant establishes that the effective concentration of chromium, which is added to the laser glass as $Cr_2O_3$, is greater than 0.025% and less than 0.10%. The preferred nominal concentration of chromium, which is added to the laser glass as $Ce_2O_3$, is 0.05% and the preferred concentration range of chromium is 0.03 to 0.07%. The effective concentration of cerium in the laser glasses tested is greater than 0.2% and less than 6%. The preferred nominal concentration of cerium is 3% and the preferred range of cerium is 2 to 4%.

EXAMPLES

Testing was conducted using one-quarter by three-quarter inch laser rods polished plano-plano. The laser included a 65% front reflector and a maximum reflectivity rear mirror, a conventional zenon flashlamp, 25 microfarad capacitor, 50 microhenry inductor and a power supply of 0 to 2000 volts. First, comparing commercial Q98 phosphate laser rods doped with 6% $Nd_2O_3$ available from the assignee of the present invention, as described in the above-identified patent, with phosphate laser rods having a substantially similar composition, but including 0.5% $Cr_2O_3$ and 3% $Ce_2O_3$ auxiliary dopants, a substantial improvement in the pumping efficiency was observed, as follows:

| Power | Input | Q98 | Q98AD |
|---|---|---|---|
| 1.0 | 12.5 | 8 | 156 |
| 1.2 | 18 | 137 | 456 |
| 1.4 | 24.5 | 283 | 614 |
| 1.6 | 32 | 510 | 826 |
| 1.8 | 40.5 | 710 | 1119 |

The power is given in kilovolts and the laser input energy is given in joules. Q98 is the output energy of commercial Q98 phosphate laser glass, given in milijoules, and Q98AD is the output energy in milijoules of the phosphate laser glass which included 0.05% $Cr_2O_3$ and 3% $Ce_2O_3$, as auxiliary dopants. The nominal composition of Q98 laser glass, is as follows:

| Constituent | Percent |
|---|---|
| $P_2O_5$ | 66.8 |
| $Li_2O$ | 1.8 |
| $K_2O$ | 1.0 |
| BaO | 25 |
| $Al_2O_3$ | 1.8 |
| $Nd_2O_3$ | 6 |
| $Nb_2O_5$ | 1.2 |
| $Sb_2O_3$ | 0.5 |

As described above, the Q98AD laser glass composition included 3% $Ce_2O_3$ and 0.05% $Cr_2O_3$, which was substituted for the $Nb_2O_5$ and $Sb_2O_3$ in the above formulation of Q98 laser glass. As will be understood from the test data set forth above, the addition of the $Cr_2O_3$ and $Ce_2O_3$ auxiliary dopants increased the sensitivity of the glass at the lower input energies and resulted in a very substantial improvement in the pumping efficiency of the laser glass at all levels of input.

The preferred ranges of cerium and chromium were also tested in Q98 phosphate laser glass, as described above, and the results were as follows:

| % $Ce_2O_3$ | % $Cr_2O_3$ | Output |
|---|---|---|
| 3% | 0.05% | 1125 |
| 4% | 0.05% | 1000 |
| 4% | 0.075% | 1000 |
| 2% | 0.025% | 940 |

The output is again given in milijoules and the tests were conducted using a laser, as described above. The results of these tests should be compared with the standard output of Q98 phosphate laser glass of approximately 871 milijoules. Further, as set forth in the above table, the improvement in the pumping efficiency was comparitively less at 0.025% $Cr_2O_3$ and 2% $Ce_2O_3$.

Similar results and improvements were found with $Q_{89}$ and Q100 phosphate laser glasses, as described in the above-referenced patent. In tests conducted with Q100 laser glass, the improvement in the energy output was found as follows:

| Power | Q100 | Q100AD |
|---|---|---|
| 1 | 113 | 210 |
| 1.2 | 322 | 416 |
| 1.4 | 542 | 682 |
| 1.6 | 763 | 957 |
| 1.8 | 1050 | 1261 |

Again, the power input is given in kilivolts and the output of Q100 and Q100AD (auxiliary doped) is given in milijoules. Q100 is the phosphate laser glass commercially available from the assignee of the present invention and Q100AD is substantially the same glass composition including 3% $Ce_2O_3$ and 0.05% $Cr_2O_3$.

Tests were also conducted using QE7 phosphate laser glass available from the assignee of the present application, which is very similar to Q99, except that $Er_2O_3$ is substituted for $Nd_2O_3$. Acceptable concentrations of $Er_2O_3$ is 0.05 to 1.0, however the preferred compositions include 0.1 to 0.5 $Er_2O_3$. In a series of tests using QE7 laser glass, th preferred concentration of $Cr_2O_3$ was determined, as follows:

| % $Cr_2O_3$ | Energy Output |
|---|---|
| 0.025 | 390 |
| 0.035 | 770 |
| 0.05 | 830 |
| 0.07 | 750 |
| 0.10 | 400 |

The output is again given in milijoules and all of the glass compositions were essentially the composition of QE7, as described above, with the addition of 3% $Ce_2O_3$ plus the concentration of $Cr_2O_3$ set forth in the chart. The nominal or conventional output of QE7 phosphate laser glass is about 430 milijoules. Thus, little or no improvement was found where the concentration of $Cr_2O_3$ was equal to or less than 0.025%, or equal to or greater than 0.10%. Further, the most preferred concentration of $Cr_2O_3$ is about 5%, which resulted in a 100% improvement in the pumping efficiency of the laser glass.

Tests were also conducted to determine the preferred range of cerium in the phosphate laser glasses, as described above, wherein a similar bell-shaped curve was found, wherein concentrations of 0.2% and 6% cerium was found to result in little or no improvement in the pumping efficiency, wherein the laser glass included 0.05% $Ce_2O_3$. The optimum percentage of $Ce_2O_3$ in the laser glasses tested was 3% at the apogee of the bell-shaped curve and the most preferred range of $Ce_2O_3$ was 2 to 4%.

Tests are now being conducted with silicate laser glasses, particularly Q246 silicate laser glass available from the assignee of the present application. Although this testing is not complete, it is believed that the combination of $Ce_2O_3$ and $Cr_2O_3$ in the ranges stated will also result in an improvement in the pumping efficiencies of silicate laser glasses.

As described above, the addition of chromium and cerium to conventional laser glass compositions, particularly phosphate laser glasses, sensitizes the flourescence of the laser glass and results in a substantial improvement in the optical pumping efficiency of the laser. Although this improvement has been established in several phosphate laser glass compositions, the results cannot be accurately determined for all laser glass compositions. It is believed however that the combination of auxiliary dopants of this invention will result in a substantial improvement in the efficiency of other laser glasses based upon the testing described above.

I claim:

1. A sensitized phosphate laser glass composition having $P_2O_5$ as the primary glass constituent, a lasing dopant selected from the group consisting of $Nd_2O_3$ and $Er_2O_3$, and an auxiliary dopant consisting essentially of 0.1 to 5% by weight $Ce_2O_3$ and 0.025 to 0.1% $Cr_2O_3$.

2. The sensitized laser glass defined in claim 1, wherein said auxiliary dopant consists essentially of 2 to 4% by weight cerium and 0.03 to 0.07% chromium.

3. The sensitized laser glass defined in claim 1, wherein the nominal concentration of said auxiliary lasing dopant consists essentially of 3% cerium and 0.05% chromium.

4. A sensitized laser glass consisting of the following composition in weight percent: 50 to 70% $P_2O_5$, 1 to 5% of an alkaline metal oxide, 15 to 40% BaO, 1 to 3% $Al_2O_3$, 0 to 25% CaO plus SrO, 0 to 5% of an antisolarant, 0.5 to 25% of a primary lasing dopant selected from the group consisting of $Nd_2O_3$ and $Er_2O_3$ and an auxiliary dopant consisting essentially of 0.1 to 5% $Ce_2O_3$ and 0.025 to 0.1% $Cr_2O_3$.

5. The sensitized laser glass composition defined in claim 4, wherein said laser glass composition includes 0.5 to 11% by weight $Nd_2O_3$ as the primary lasing dopant.

6. The sensitized laser glass composition defined in claim 4, wherein said laser glass composition includes 0.05 to 1.0% by weight $Er_2O_3$ as the primary lasing dopant.

7. The sensitized laser glass composition defined in claim 4, wherein said auxiliary dopant consists of 2 to 4% by weight $Ce_2O_3$ and 0.03 to 0.07% $Cr_2O_3$.

8. The sensitized laser glass composition defined in claim 4, wherein the nominal concentration of said auxiliary dopant is 3% by weight $Ce_2O_3$ and 0.05% $Cr_2O_3$.

9. A sensitized phosphate laser glass composition including a primary lasing dopant of a rare earth metal element selected from the group consisting of $Nd_2O_3$ and $Er_2O_3$ and an auxiliary dopant sensitizing said primary dopant consisting essentially of 0.1 to 5% by weight $Ce_2O_3$ and 0.025 to 0.1% by weight $Cr_2O_3$.

10. The sensitized laser glass composition defined in claim 9, wherein said primary lasing dopant is 0.2 to 11% by weight $Nd_2O_3$ and said auxiliary dopant is 2 to 4% $Ce_2O_3$ and 0.03 to 0.07% by weight $Cr_2O_3$.

11. The sensitized laser glass composition defined in claim 9, wherein the nominal concentration of said auxiliary dopant is 3% by weight $Ce_2O_3$ and 0.05% by weight $Cr_2O_3$.

12. The sensitized laser glass composition defined in claim 9, wherein said primary lasing dopant is 0.05 to 1.0% by weight $Er_2O_3$.

13. A sensitized phosphate laser glass having $P_2O_5$ as the primary glass constituent, a primary lasing dopant selected from the group consisting of $Nd_2O_3$ and $Er_2O_3$ and auxiliary dopants which absorb laser flashlamp emissions in regions spaced from the absorption band of the primary dopant, thus improving the efficiency of the laser glass, wherein said auxiliary dopants consist essentially of greater than 0.025% by weight $Cr_2O_3$ and less than 0.1% by weight $Cr_2O_3$ and 0.1 to 5% by weight $Ce_2O_3$.

14. The sensitized laser glass defined in claim 13, wherein said auxiliary dopant consists of 2 to 4% by weight $Ce_2O_3$ and 0.03 to 0.07% by weight $Cr_2O_3$.

15. The sensitized laser glass defined in claim 13, wherein the nominal concentration of said auxiliary dopant is 3% by weight $Ce_2O_3$ and 0.05% by weight $Cr_2O_3$.

* * * * *